United States Patent [19]

Hoogendonk

[11] 3,719,715

[45] March 6, 1973

[54] DIPHENYLOLPROPANE PRILLS

[75] Inventor: Johan W. Hoogendonk, Geleen, Netherlands

[73] Assignee: Stamicarbon N.V., Heerlen, Netherlands

[22] Filed: Jan. 8, 1970

[21] Appl. No.: 7,313

Related U.S. Application Data

[62] Division of Ser. No. 684,934, Nov. 22, 1967, Pat. No. 3,518,329.

[52] U.S. Cl. .................................................. 260/619 A
[51] Int. Cl. ................................................... C07c 39/16
[58] Field of Search ..................................... 260/619 A

[56] References Cited

UNITED STATES PATENTS

| | | | |
|---|---|---|---|
| 2,791,616 | 5/1957 | Luten | 260/619 A |
| 2,845,464 | 7/1958 | Luten | 260/619 A |
| 2,923,744 | 2/1960 | Scriabine et al. | 260/619 A |
| 3,049,569 | 8/1962 | Apel et al. | 260/619 A |
| 3,073,868 | 1/1963 | Prahl et al. | 260/619 A |
| 3,207,795 | 9/1965 | Prahl et al. | 260/619 A |

FOREIGN PATENTS OR APPLICATIONS

| | | | |
|---|---|---|---|
| 687,780 | 6/1964 | Canada | 260/619 A |

*Primary Examiner*—Bernard Helfin
*Attorney*—Cushman, Darby & Cushman

[57] ABSTRACT

An improved solid form of diphenylolpropane is disclosed consisting of substantially dust-free, strong prills having reduced electrostatic characteristics and improved free flowing characteristics.

1 Claim, No Drawings

DIPHENYLOLPROPANE PRILLS

CROSS-REFERENCE TO RELATED APPLICATIONS

This is a divisional application of Ser. No. 684,934, filed Nov. 22, 1967, now U.S. Pat. No. 3,518,329.

BACKGROUND OF THE INVENTION:

This invention relates to the granules of diphenylolpropane. Diphenylolpropane (hereinafter referred to as d.p.p.) has conventionally been made in the form of flakes, by cooling a melt thereof on a rotary cooler. The flakes are obtained by scraping the resulting solid mass off the cooler.

Such flakes present handling difficulties. Initially they are sticky, but finally they become brittle, and the resulting irregular flakes readily pulverize to produce a mass containing a high percentage of dust. This condition interferes with the regular dry feed rate of the product and also gives rise to troubles during withdrawal from storage supply and discharging from bulk cars. The material is also very liable to electrostatic charging, which causes still further difficulties, particularly with the pulverized flakes.

The abovementioned difficulties can be largely overcome by forming the d.p.p. into prills. These d.p.p. prills may be prepared generally by means of the so-called prilling process used in the manufacture of granular fertilizer. In this process the substance to be prilled is melted, and then sprayed, at a temperature close to the melting point, so that the molten droplets thus formed are allowed to fall through a gaseous medium with simultaneous direct cooling thereof. The d.p.p. is thereby solidified, the drops forming the granules or prills.

However, efforts to prill d.p.p. have not been successful, and this invention has discovered the required inter-relationship of the prilling conditions which will lead to usefully superior products. For instance, it has been observed that prills with a particle size below about 0.6 mm are so susceptible to electrostatic charging that they are not free-flowing. Further, the electrostatic charge of such a product can lead to explosive situations. In other instances where the particles size is large enough to permit free flowing, the prills still have a relatively low resistance to pulverization and, furthermore, will develop cracks after a few hours. Thus disintegration to smaller fragments during transport and storage will not be avoided. Such prills of d.p.p., with an average diameter of approximately 1 mm, with practically no granules of less than 0.6 mm, can be prepared by the prilling process wherein the sprayed droplets are cooled down to a temperature of at most about 30°C, within a height of fall of approximately 12 meters.

GENERAL DESCRIPTION OF THE INVENTION

According to the present invention, the resistance to pulverization of d.p.p. prills is improved, their electrostatic activity is considerably lowered, and the material has improved free flowing characteristics, if the sprayed droplets are cooled by direct cooling in a gaseous medium, preferably in air, in the additional presence of a seeding substance suspended in the gaseous coolant, and the average diameter of the granules is between 1 mm and 2 mm. Seeding has the effect of considerably improving the quality of the final product.

If d.p.p. is prilled in the above way to an average diameter of at least 1 mm, undesired prills are practically absent. At an average diameter of 1 mm 67 percent has a diameter of between 0.75 mm and 1.25 mm, so that the material has free flowing characteristics.

Droplets of 1 mm average diameter may be obtained if the process of preparing the d.p.p. prills is preferably so conducted that the droplets are solidified by cooling them to approximately 60°C or below, in the presence of a seeding material suspended in the coolant, over an effective height of fall of approximately 7 meters. Since the d.p.p. prills are only cooled down to about 60°C, the height of fall may be smaller than when no seeding material is suspended in the coolant, thus considerably reducing plant cost. To minimize or avoid undesirable electrostatic effects, larger granules may be produced. However, this is less attractive economically; for production of prills of 2 mm diameter, the effective fall should be already about 50 meters.

As the normal industrial quality requirements of d.p.p. do not allow the presence of foreign substances in the prills, d.p.p. dust is preferably suspended in the coolant as the seeding substance. D.p.p. prills, or flakes, which may be ground or crushed, may also be used as such. The concentration of the seeding material to be suspended in the coolant for making a product of the desired resistance to pulverization and low electrostatic activity, should preferably be 100 particles of a size not exceeding 10 , per cubic centimeter of coolant.

The seeding material may be fed separately to the coolant, or may be completely or partly derived from an agitated mass of d.p.p. prills through or along which the coolant is passed. In the event the particles are entirely derived from the agitated mass, it has been found that seeding material need be supplied only during the formation of the first prills.

EXAMPLES OF THE INVENTION

The invention will be further understood from examples of the invention.

Diphenylolpropane was prilled by means of a rotary prilling vessel turning on a vertical shaft. The d.p.p. was fed to the vessel in the fluid state and forced out, under the influence of the centrifugal force, through holes in the vessel wall. The vessel was disposed in the top of a tower of circular section, its axis coinciding with that of the tower. The minimum cross-section of the tower is determined by the path traversed by the droplets under the influence of the initial velocity.

Droplets produced by a rotary prilling vessel show a normal distribution with a standard deviation $S = 0.25\,d$, where $d$ is the average droplet diameter in mm. At any value of the average diameter $d$, 99.8 percent of the droplets will come within the limits $d \pm 3.10 \times 0.25 \times d$. An analysis of the size distribution of prills of increasing diameter gives the following percentages for the numbers of prills smaller than 0.6 mm:

| Average diameter d mm | Weight percentage prills 0.6 mm |
|---|---|
| 0.7 | 28.5 |
| 0.8 | 16.0 |
| 0.9 | 9.0 |
| 1.0 | 5.5 |
| 1.2 | 2.5 |
| 1.4 | 1.0 |

A marked decrease in the percentage of prills below 0.6 mm is observed at $d = 1.0$ mm. The size distribution of the prills with the required minimum average diameter $d = 1.0$ is as follows:

| | |
|---|---|
| 0.6 mm | 5 % |
| 0.6 – 0.8 mm | 15 % |
| 0.8 – 1.0 mm | 30 % |
| 1.0 – 1.2 mm | 30 % |
| 1.2 – 1.4 mm | 15 % |
| 1.4 mm | 5 % |

By means of a 200 mm diameter prilling vessel provided with 0.9 mm perforations and rotated at a speed between 420 and 240 r.p.m. in a rower of 7 m diameter, prills with an average diameter of 0.95 mm – 1.25 mm can be produced. The height of fall required for lowering the temperature to 60°C and 30°C amounts to 7 m and 12 m resp. The volume of cooling air of 20°C needed for this purpose is approximately 30000 m³ per hour.

Example 1

D.p.p. prills of 1 mm average diameter were produced by cooling droplets of d.p.p., with a starting temperature of 160°C, down to 30°C over a height of fall of 12 m, and by cooling such droplets down to 60°C. over a height of fall of 7 m, in the presence of d.p.p. dust of a size of 10 as seeding material, suspended in the coolant. The prills were subsequently tested for their resistance to pulverization, by shaking in a horizontally disposed cylinder for half an hour at a frequency of 210 vibrations/minute. After this treatment the percentage of particles smaller than 0.42 mm was taken as a measure of the resistance to pulverization. The results were as follows:

Not seeded : 11.5 % particles 0.42 mm
Seeded : 0.4 % particles 0.42 mm

The seeded prills had a significantly higher resistance to pulverization.

The crushing strength of the above-mentioned d.p.p. prills was determined as follows. A prill was exposed to a load which was increased at the rate of 2 kg/20 sec until the prill broke. This load is a measure of the crushing strength. The results were as follows:

Not seeded : nil
Seeded : 4.4 kgs (mean of 10 measurements)

The seeded prills were thus significantly stronger.

The electrostatic charge of d.p.p. prills was also determined. The results were as follows:

Not seeded : 5.5 kV charge
Seeded : 0.65 kV charge

The seeded prills thus had a significantly lower electrostatic charge.

Example 2

D.p.p. prills were made with simultaneous cooling, using various quantities of d.p.p. as seeding material, suspended in the coolant. The prills formed were evaluated according to the above specifications on a consistent basis either as "good prills," i.e., prills resistant to pulverization, high crushing strength and low electrostatic activity, and "unsuitable prills." The results were as follows:

| Quantity of suspended seeding material in particles/cm³ size 10 $\mu$ | "Good" d.p.p. prills % |
|---|---|
| | 17 |
| 52 | 98.5 |
| 117 | 99 |
| 143 | 99 |

At a concentration of 100 particles/cm³ of size 10$\mu$, the percentage of "unsuitable prills" was negligible.

What is claimed is:

1. Free-flowing granular prills of diphenylolpropane having a crystalline structure and an average diameter between about 1 mm and about 2 mm.

* * * * *